United States Patent
Lewis et al.

(10) Patent No.: US 6,434,097 B1
(45) Date of Patent: Aug. 13, 2002

(54) DIGITAL VIDEO APPARATUS USER INTERFACE

(75) Inventors: Debbie Indira Lewis, Norcross, GA (US); Pratish Ratilal Desai, Fremont, CA (US); Robert Howard Miller, Leawood, KS (US); Michael Dillon Rich, Fishers, IN (US)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/744,111
(22) PCT Filed: Jul. 20, 1999
(86) PCT No.: PCT/US99/16380
§ 371 (c)(1), (2), (4) Date: Apr. 9, 2001
(87) PCT Pub. No.: WO00/04540
PCT Pub. Date: Jan. 27, 2000

Related U.S. Application Data
(60) Provisional application No. 60/093,345, filed on Jul. 20, 1998.

(51) Int. Cl.$^7$ .................................................. G11B 7/00
(52) U.S. Cl. .............................. 369/47.11; 369/53.37; 369/59.14
(58) Field of Search ......................... 369/47.1, 47.11, 369/47.23, 33.1, 53.37, 53.45, 59.1, 59.14

(56) References Cited

U.S. PATENT DOCUMENTS 5,343,454 A * 8/1994 Watanabe et al. ........ 369/44.32

FOREIGN PATENT DOCUMENTS

EP 0825770 2/1998

* cited by examiner

Primary Examiner—Muhammad Edun
(74) Attorney, Agent, or Firm—Joseph S. Tripoli; Paul P. Kiel

(57) ABSTRACT

A method for controlling a system for processing stored information on a storage medium, includes the following steps. Information on the storage medium is played back using one of a plurality of repeat modes during a play mode of operation. During the play mode of operation, a user is provided with an opportunity to select a repeat mode from among the plurality of repeat modes. The playback of the information on the storage medium is then changed to the selected repeat mode during the play mode of operation. Apparatus for processing information includes playback circuitry for retrieving information from the storage medium during a play mode of operation. A user control device is coupled to playback circuitry and receives user input. Control circuitry, coupled to user control device and the playback circuitry, conditions the playback circuitry to retrieve information in the play mode of operation using one of a plurality of repeat modes, select one of the plurality of repeat modes during the play mode of operation in response to the user input, and retrieve information using the repeat mode during the play mode of operation.

12 Claims, 5 Drawing Sheets

DIGITAL VIDEO APPARATUS USER INTERFACE

This application claims the benefit under 35 U.S.C. § 365 of International Application PCT/US99/16380, filed Jul. 20, 1999, which claims the benefit of U.S. Provisional Application Serial No. 60/093,345, filed Jul. 20, 1998.

The present invention relates to a user interface for a digital video apparatus, and in particular, a user interface for a digital video apparatus capable of processing a plurality of data blocks according to a user selected sequence.

Video signal processing systems that utilize storage media having digitally compressed video and audio information recorded thereon can give the user a vast number of options for controlling playback of a video title stored on such a media. One such system that is gaining rapid acceptance comprises a video disc player adapted to process information stored in accordance with the digital video disc (DVD) specification. The information on a DVD formatted disc is recorded as discrete packets of data, in accordance with the applicable video and audio data compression standards, wherein designated packets carry data associated with various data streams, such as alternative video angles, audio tracks, subpicture streams, etc. A disc player reading a DVD formatted disc may be controlled to display certain packets of data and skip over others. In this manner, the DVD system can be used to prevent unauthorized access to information on a particular disc as well as seamlessly provide multiple variations of a video title, such as multiple camera angles and story endings, in accordance with user commands.

One useful aspect of the DVD system is that it allows the user to playback the disc contents using one of a plurality of repeat modes. DVD formatted discs are generally authored to include one or more video titles, wherein each video title corresponds to a designated program unit, such as a movie or a television episode. Each video title may in turn be divided into one or more part-of-title units, also called chapters, wherein each chapter corresponds to a predetermined portion of the video title. Using this format, a disc player may be configured to repeat the playback of the disc contents in one of a plurality of repeat modes. The available repeat modes usually include: 1) title, wherein the current title is repeated; 2) part-of-title, wherein the current part-of-title (chapter) is repeated; 3) A/B, wherein the disc player repeats between points A and B selected by the user; and 4) OFF.

To change a disc player's repeat mode setting, a user ordinarily must stop disc playback, call up the appropriate player set-up menu, make the necessary selections and restart the disc playback. Even if the user is not directly required to start and stop disc playback, the disc player automatically halts playback of the disc and restarts the disc when the user selects the playmode. If the user wishes to change the repeat modes frequently, the requirement to stop disc playback and navigate the disc player set-up menu can quickly become annoying. The present invention recognizes that it is desirable to provide a user interface, method and apparatus which allows a user to dynamically change the disc player's repeat mode setting to avoid the inconvenience noted above.

In accordance with the present invention a user interface, method and apparatus is provided for allowing a user to dynamically change a repeat mode setting of a digital video apparatus, in particular a disc player adapted to process DVD formatted discs. Advantageously, the present invention allows the user to dynamically change the player's repeat mode setting without having to call up and navigate through the player setup menu.

The invention will be described with reference to the accompanying drawings, wherein.

Figure 5:
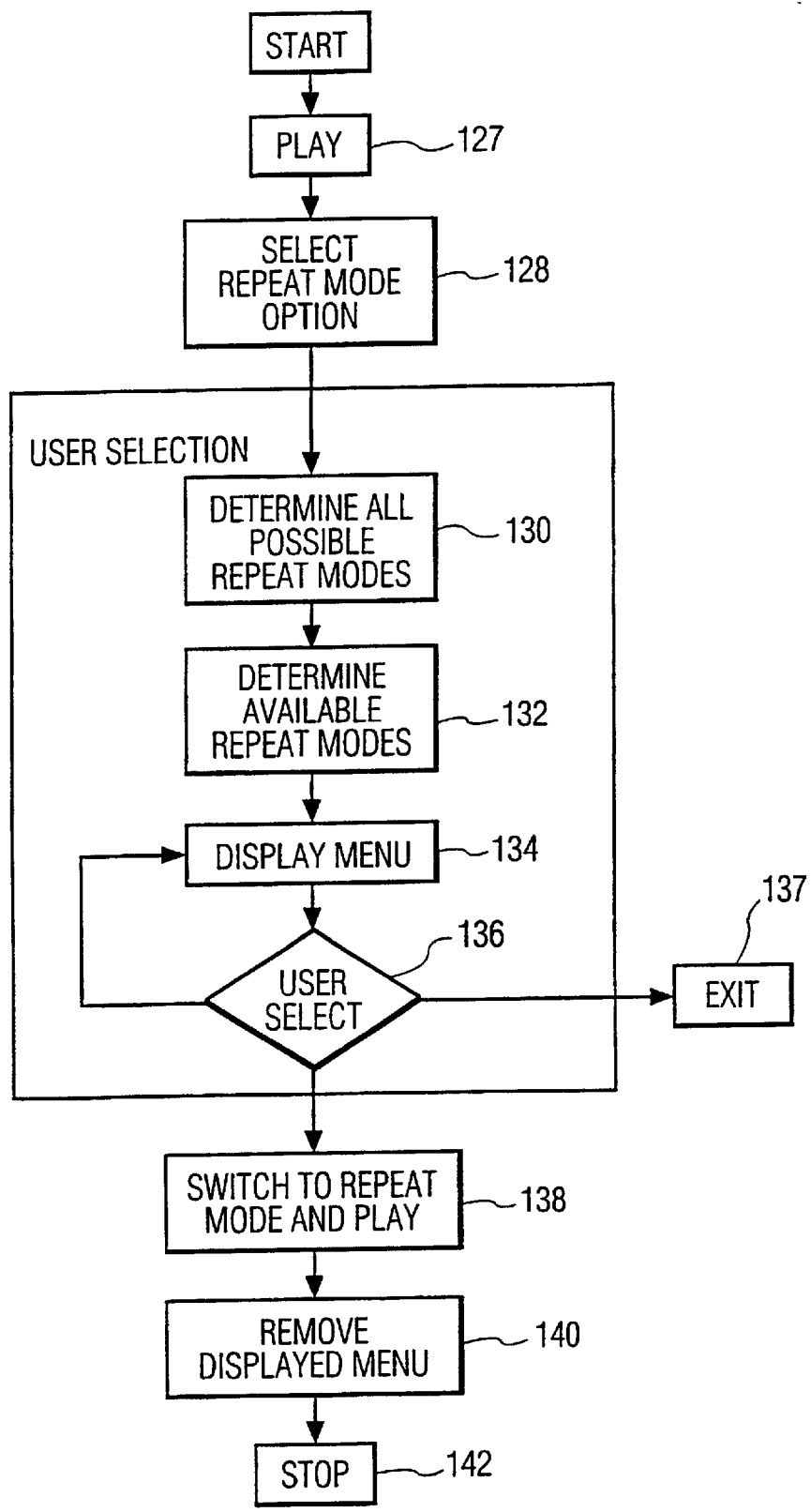
Figure 6:
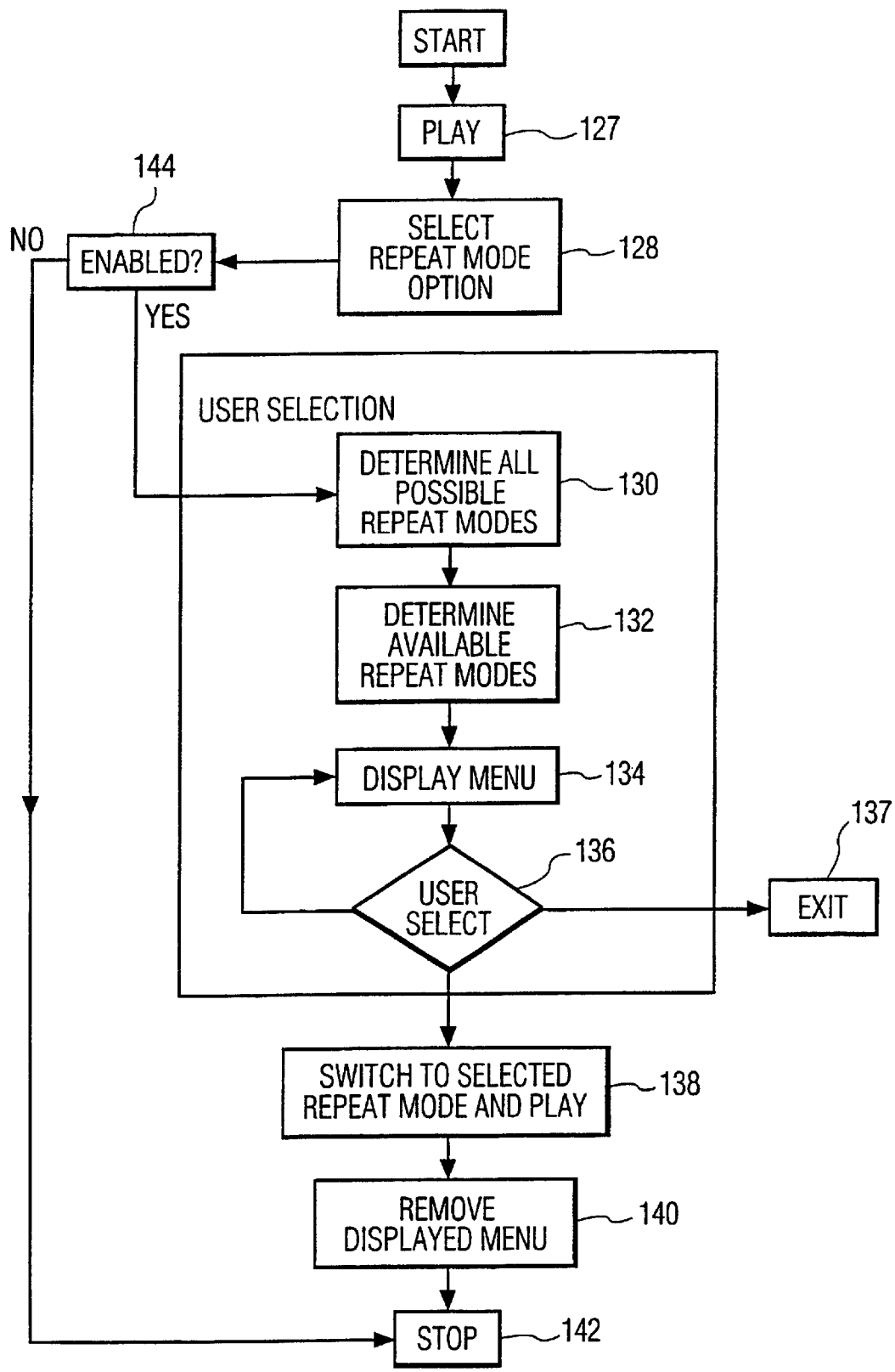

FIG. 5 is a flowchart illustrating the steps for implementing the displaying of and the dynamically selecting among particular ones of a plurality of repeat modes on a DVD player for a particular DVD disk; and FIG. 6 is a flowchart illustrating another embodiment of the method for implementing the displaying and dynamically selecting between a particular one of a plurality of repeat modes on a DVD player for a particular DVD disk.

Although the exemplary embodiment is described with reference to a digital video apparatus adapted to read compressed video and audio data from a disc and to process the data in accordance with the DVD specification, it is to be understood that the present invention may be used in any digital video apparatus capable of processing digital video and audio data, wherein the data has been stored or is received in distinct data blocks and the data blocks may be played back according to a selected playback sequence.

Figure 1:
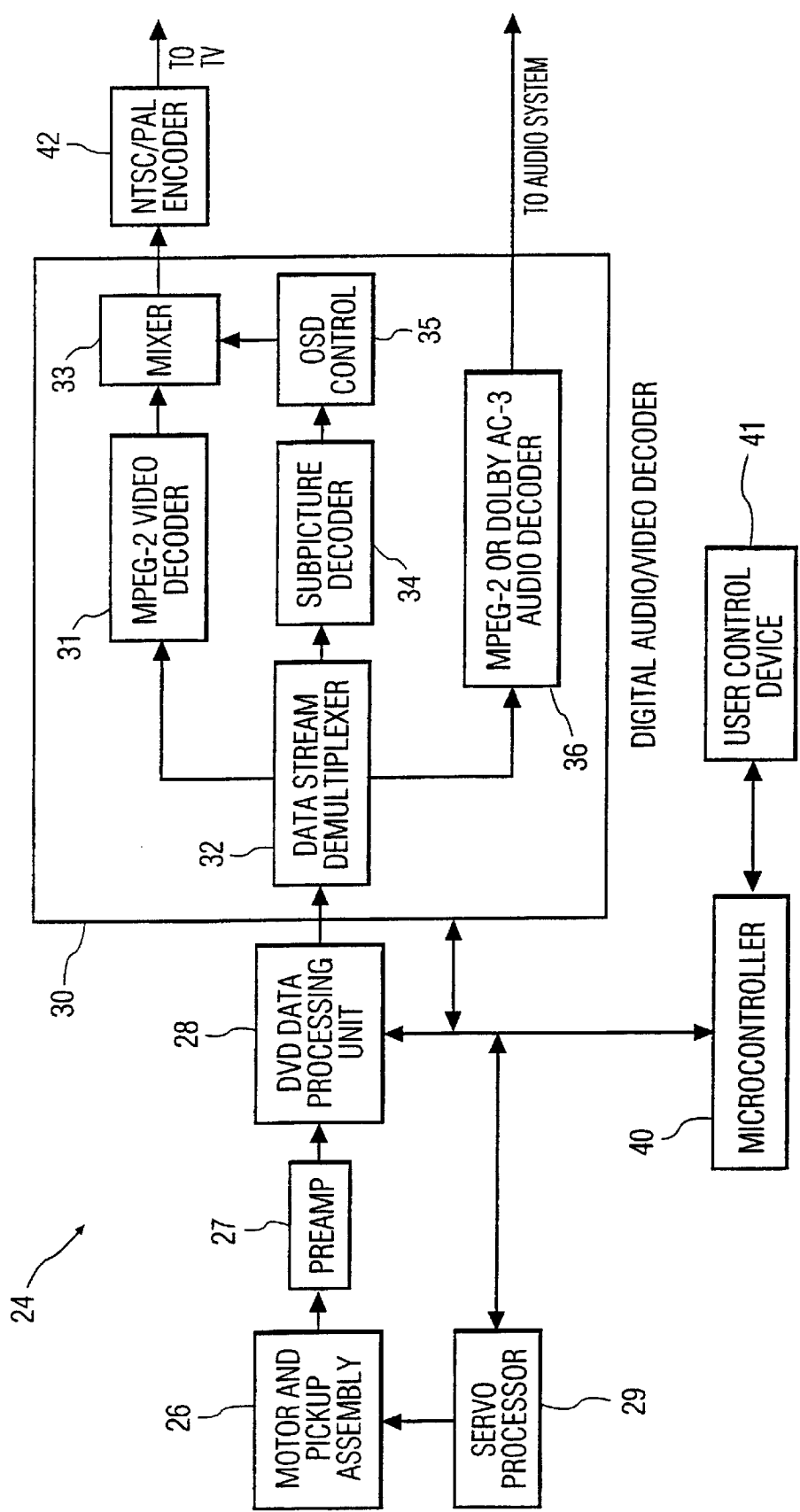
FIG. 1 is a block diagram of a digital video disc player suitable for implementing the dynamic repeat mode selection feature of the present invention.

FIG. 1 is a block diagram showing the basic elements of an exemplary digital video disc player suitable for implementing the dynamic selection feature of the present invention. The construction and operation of these elements are known to one of ordinary skill in the art and will not be discussed in detail here. Disc player 24 comprises motor and pickup assembly 26 which, under the control of servo processor 29, spins the disc and reads the information stored thereon. Preamp 27 and DVD data processing unit 28 translate the electrical pulses from motor and pickup assembly 26 into digital data that can be further processed by digital audio/video decoder unit 30. DVD data processing unit 28 typically performs functions such as demodulation, error correction and descrambling of the raw data read from the disc so that the data is in a suitable format for decoder unit 30.

Decoder unit 30 receives the demodulated, error corrected and descrambled data, processes the data, and provides the appropriate video and audio signals to a display unit, such as a television set. Decoder unit 30 comprises data stream demultiplexer 32 which demultiplexes the data from data processing unit 28 into a plurality of separate data streams, including a video stream, an audio stream and a subpicture stream, and provides the data streams to their respective data decoders. Video decoder 31 receives the video stream and provides a video signal to mixer 33. Subpicture decoder 34 receives the subpicture stream and provides data to on-screen display (OSD) control 35 which provides OSD video signals to mixer 33. The combined video signal from mixer 33 is provided to NTSC/PAL encoder 42 which provides a video signal that conforms to the appropriate video signal standard to a video display device. Audio decoder 36 receives the audio streams from data stream demultiplexer 32 and provide the appropriate audio signals to an audio system.

Microcontroller 40 controls the operation of disc player 24. Microcontroller 40 is coupled to user control device 41, which may comprise IR remote control devices, front panel buttons or the like, and translates data from user control device 41 to control the operation of the various elements of disc player 24 described above. Microcontroller 40 may include a memory, or may be coupled to a memory, for storing various tables used controlling the presentation of programs. The tables may be loaded from a disk or generated in response to user input. Typically, microcontroller 40 is also configured to control various access features of disc player 24 including, but not limited to, parental lock out, decryption of encrypted discs, dialing remote controllers to gain access to encrypted discs. Microcontroller 40 may be embodied in various forms, including, but not limited to, a dedicated integrated circuit, or a part of a decoder/controller unit.

Figure 2:
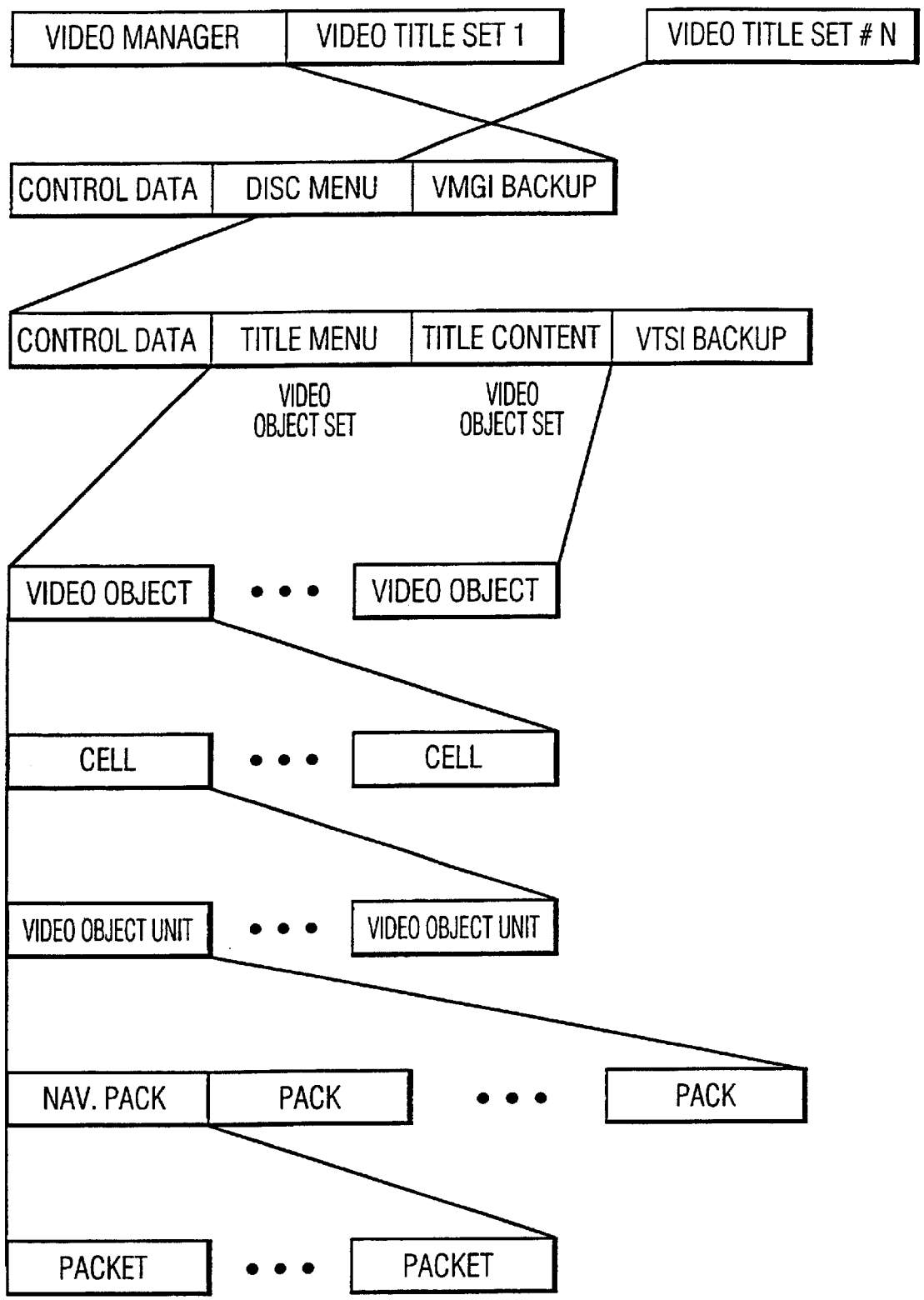
FIG. 2 is a diagram of a data structure in accordance with the DVD specification.

FIG. 2 illustrates the structure of the program data and control data stored on a disc in accordance with the DVD specification and suitable for use with disc player 24. The data structure is hierarchical, wherein each data block is divided up into component data blocks, which are further divided into smaller component data blocks. Each video title set, which corresponds to a designated program unit, for example, a movie or an episode of a television show, is comprised of video object sets, which comprises a plurality of video objects.

Each video object is comprised of a plurality of cells, which may be considered a data unit for presentation having a plurality of data unit types, such as video, audio, subpicture, etc, and corresponds to a program segment. Each cell is in turn comprised of a plurality of video object units (VOBUs). Each VOBU is comprised of a navigation pack (NAV_PACK) and a plurality of packs, which are subdivided into a plurality of packets. A VOBU generally corresponds to an MPEG-2 Group of Pictures (GOP) with an associated control data structure, the NAV_PACK. The NAV_PACK of each VOBU contains information such as sector addresses of VOBUs relative to the current one (both forwards and backwards in temporal presentation order), and the amount of elapsed time in cell presentation which corresponds to the current VOBU.

Figure 3:
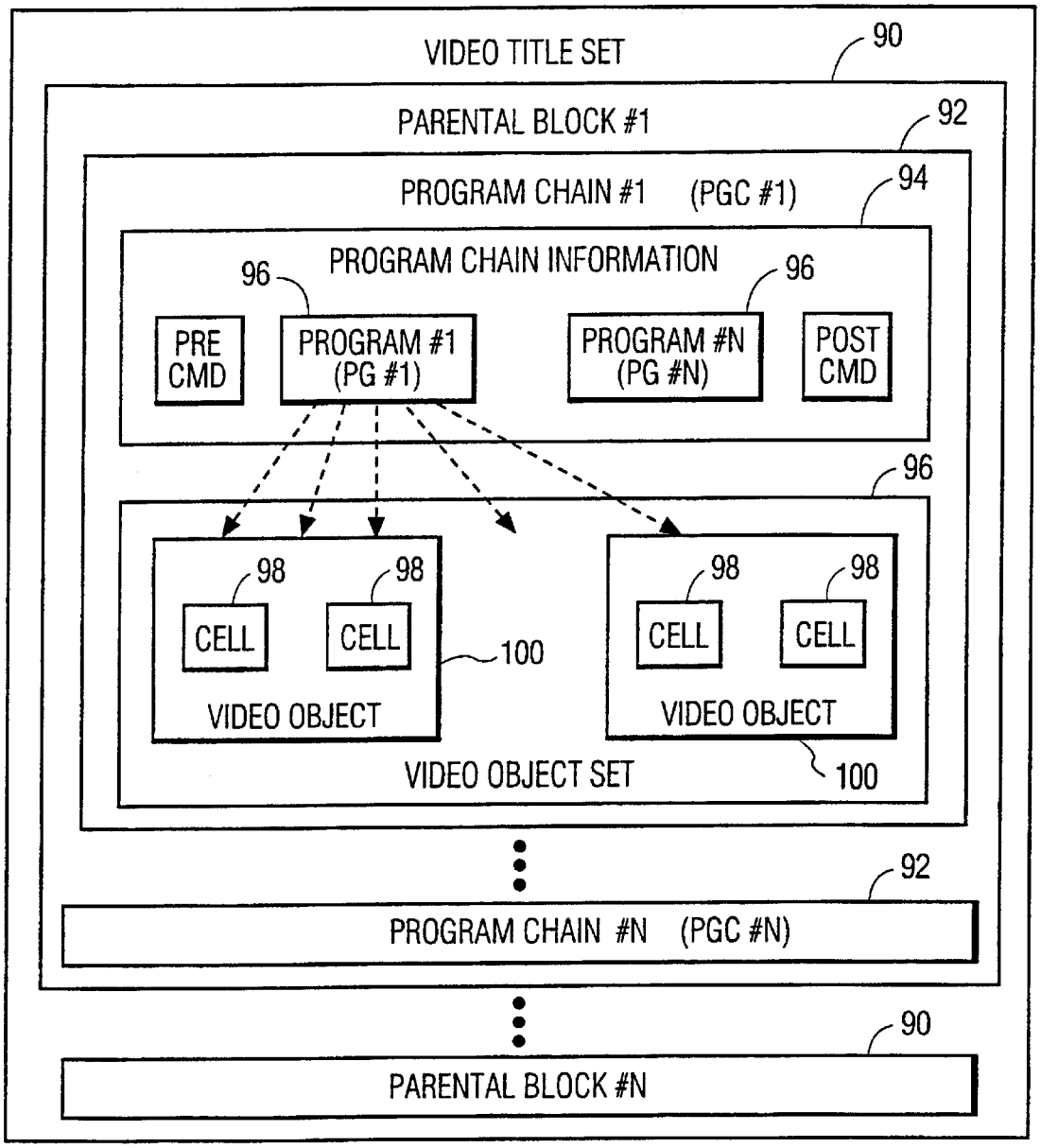
FIG. 3 is a block diagram of a presentation structure in accordance with the DVD specification.

Data stored in accordance with the DVD specification is also logically organized into a presentation structure in order to provide flexibility in the manner in which the data can be presented. FIG. 3 illustrates the presentation structure in accordance with the DVD specification and suitable for use with disc player 24. This presentation structure is overlaid onto the data structure of FIG. 2. At the base level, the presentation sequence is defined by programs (PGs) 96, each of which comprise a linked list of pointers to cells. A plurality of PGs 96 may be combined to form a program chain information (PGCI) 94, a plurality of which may in turn be combined to form program chain (PGC) 92.

During presentation of a video titles, disc player 24 selects the appropriate PGC for loading into a primary table, based on such criteria as the user selected title and parental rating preference. Thereafter, disc player 24 reads the data stored on the disc based on the linked list of pointers contained in the PGs. As is known, disc players generally utilize various look ahead algorithms in order to read the data from the disc and store the data on a system buffer prior to actual presentation in order to provide seamless presentation.

As noted above, the present invention recognizes that an annoyance and inconvenience may be caused if a user is forced to stop playback of a disc, call up the player menu, make the necessary selections, and restart the disc playback each time the user wants to change the disc player's repeat mode setting. Even if the user is not directly required to start and stop disc playback, the disc player automatically halts playback of the disc and restarts the disc when the user selects the repeat mode.

The present invention provides a user interface, method and apparatus for allowing a user to dynamically change the disc player's repeat mode setting so that the user is not forced to repeatedly perform the procedure detailed above.

Figure 4:
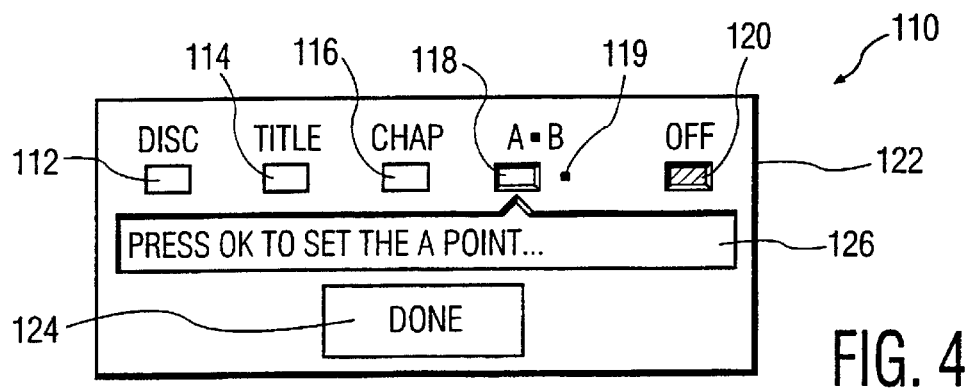
FIG. 4 is an on-screen display suitable for use with the dynamic repeat mode selection feature of the present invention.

A suitable display 110 for implementing the present user interface and allowing the user to dynamically select a playmode is shown in FIG. 4. Display 110 is generated and shown to the user when the user selects the repeat mode selection display, for example, by using any one of the conventionally known methods for selecting an item on an on-screen display, such as moving a highlight by pressing cursor control keys on a remote control device or a keyboard. Selections from display 110 may be made in a similar manner.

Display 110 comprises buttons 112, 114, 116, and 118 which correspond to disc, title, chapter, and A/B repeat modes respectively. Button 120 may be selected to turn OFF the repeat modes. Pointer 126 points to the current repeat mode or the repeat mode to be selected. Text block 122 provides a description of the selected repeat mode and also user prompts for setting the A and B points in the A/B repeat mode. Button 124 allows the user to exit from display 110.

In operation, display 110 is generated by microcontroller 40 and shown on a portion of the video display when the user selects the repeat mode selection display. Display 110 is shown and the options thereon may be selected dynamically as the video title continues to play in another portion of the video display. Display 110 shows the current repeat mode and the other available repeat modes. A non-available repeat mode may be indicated by greying out the button icon associated with the non-available repeat mode. The user selects a new repeat mode by moving pointer 126 under the desired playmode button and pressing an "OK", or any other suitable key on remote control device 41. If the user selects the A/B repeat mode, display 110 prompts the user to enter the A and B points. In FIG. 4, a color change in button 118 beneath "A" and text block 122 indicates that the user may select the A point by pressing the "OK" key on remote control device 41. After the user has selected the A point, dot 119 beneath "B" changes to a button shape and text block 122 indicates that the user may select the B point by pressing the "OK" key. Once the B point has been set, disc player 24 will begin repeating playback between the selected A and B points. Alternatively, display 110 may require the user to enter a request confirmation before starting the A/B repeat mode.

As discussed earlier, a user interface, method and apparatus is provided for allowing a user to dynamically change a repeat mode setting of a digital video apparatus, in particular a disk player adapted to process DVD formatted disks. Thus, a unique feature added to the disk player is required to avoid the inconvenience of stopping disk playback, navigating the disk player's setup menu, and restarting when the user selects or changes the desired repeat mode. The repeat mode allows a user to playback the disk contents on a disk player configured to repeat the playback of the disk contents in one of a plurality of repeat modes.

There are four repeat modes currently available: (1) Title, (2) Chapter, (3) A/B, and (4) OFF. The first repeat modes is title, wherein the current title is repeated. Thus, a movie can be repeated over and over. The next repeat mode is part-of-title, wherein the current chapter is repeated. An example of this is a certain recorded television episode, or scene within a movie, is repeated over and over. Another repeat mode is A/B, wherein the disk player repeats between points A and B selected by the user. A user can repeat between points available under the DVD Specification 1.0 such as Title and Chapter, and those points not available under the DVD Specification 1.0 such as a part of a video in the middle of the title or scene. Thus, a user can bookmark two distinct points and repeat playback between those two points continually. The two points can be respective beginnings of titles, or chapters, or a selected location within a title or chapter, or a combination thereof The default setting for the repeat mode is OFF. The major advantage to this dynamic changing of repeat modes is not having to call up and navigate through the player set-up menu. Disk player 24 can also include the feature of enabling and disabling this feature of dynamically changing a repeat mode setting of a disk player. For example, disabling dynamic changes so that the entire video is seen uninterrupted.

The dynamic selection feature of the present invention may be implemented in disc player 24 as follows. When a repeat mode is selected by the user, disc player 24 sets a modal flag variable indicating that a repeat mode has been selected. Disc player 24 checks the modal flag variables associated with the different repeat modes designated points of the presentation sequence and adjusts the presentation sequence as necessary. In the case of the title repeat mode, disc player 24 checks for the setting of the title repeat mode variable after ending presentation of the title and prior to the execution of the last post command of the last PGCI. The post command is located at the end of the PGCI. If the title repeat mode variable is set, disc player 24 ignores the remaining post commands in the title and returns to the beginning of the title based on the navigation information loaded from the disc. In the case of a chapter repeat mode, disc player checks for whether there is a chapter repeat mode variable associated with the last cell of the chapter. In this case, when the user selects a chapter repeat mode, disc player 24 generates an auxiliary table which associates the chapter repeat mode variable with a particular cell. During presentation, as disc player 24 looks ahead to the cells to be presented, disc player 24 also checks whether there is a chapter repeat mode variable associated with the upcoming cells. If so, disc player 24 returns to the beginning of the chapter immediately after presentation of the last cell in the chapter.

In the case of A/B repeat, wherein disc player 24 repeats presentation of the program material in the interval between point A and point B, disc player 24 implements the repeat function by extending the resume function specified in the DVD specification. According to the DVD specification, when a user stops the presentation, disc player 24 stores various data associated with the stopping point, such as, the nearest NAV_PACK, the chapter number, and the title number. When the user subsequently restarts the presentation, disc player uses the stored information, including the navigation information, to begin replay from the stopped point.

In the present invention, disc player 24 stores the various data associated with the stop and resume function when the user specifies the A and B points. However, in this case, disc player 24 does not stop and restart presentation. Instead, disc player stores the information as required by the stop function and stores the information in an auxiliary table. The A and B point locations are associated with their respective cells in the auxiliary table. Again, during presentation, disc player 24 looks ahead at the cells to be presented. In this looking ahead process, disc player 24 also determines whether the upcoming cells have an A or B point associated with them. If an upcoming cell has a B point associated with it, and the A/B repeat mode variable is set, disc player 24 plays the cell and then jumps the presentation to the cell associated with the A point.

It can be seen that setting the A and B points by storing the data in a fashion similar to the resume mode effectively truncates a cell so that any arbitrary point on the cell can be accessed. In all three cases, selection of a particular repeat mode results in the disc player setting a modal flag variable and capturing the necessary information at various points in the presentation, wherein the variable is checked during designate points in the program presentation so that dynamic mode selection is made possible.

A flowchart illustrating the steps for implementing the displaying of and the dynamically selecting among particular ones of a plurality of repeat modes on a DVD player for a particular DVD disk is shown in FIG. 5. In step 127, disk player 24 waits for the user to send a PLAY command and upon receiving the PLAY command searches for the disk player's default settings. In step 128, the user can press a button information display 110 to select a repeat mode. In step 130, disk player 24 determines all possible repeat modes with respect to the particular disk. In step 132, disk player 24 will determine what repeat modes are available, i.e. those repeat modes with titles or chapters not blocked with a parent block or those not enabled. In step 134, an on-screen display 110 is overlaid, in a known manner, onto the video display generated by the disk player 24 and allows the user to set the repeat mode while continuing to watch the title playback in a background portion of the video display. The menu display distinguishes between those repeat modes present and available and those present and unavailable, in the manner described above. The user is allowed to select among the available repeat modes in step 136. The menu display tracks the user changes of the available repeat modes in a known manner. In step 137, the user may elect to exit the routine without changing the current repeat mode to any one of a plurality of repeat modes. In step 138, the disk player 24 switches the current repeat mode to the new repeat mode and plays the particular disk in accordance with the selected repeat mode. In step 140, after disk player 24 switches to and plays the new repeat mode, the on-screen display 110 is no longer overlaid onto the video display generated by the disk player 24 and the video signal processing system returns to normal display.

Enabling/disabling of the method for implementing the displaying and dynamically selecting a repeat mode may occur by selecting the desired mode on a setup option created by the system's on-screen display processor during a setup mode of operation. The setup mode of operation, which enables controlling various features such as video processing characteristics, sound characteristics, closed captioning, etc., in addition to repeat modes, may be activated, for example by pushing a control button on a remote control device. Desired features/modes/settings are selected from the displayed setup menu by using buttons on the remote control, all in a known manner.

FIG. 6 shows, in flowchart form, another embodiment of the method for implementing the displaying and dynamically selecting between a particular one of a plurality of repeat modes on a DVD player for a particular DVD) disk in accordance with the principals of the invention. Steps in FIG. 6 which are the same as those illustrated in FIG. 5 have the same reference numbers as in FIG. 5, operate in the same manner as the corresponding steps in FIG. 5 as described above, and will not be described again here. The arrangement depicted in FIG. 6 provides for selectively enabling the mode of operation in which the user selects one of a plurality of different repeat modes. Specifically, FIG. 6 includes step 144 following step 128 which tests to determine if the access to repeat mode is enabled. If access to repeat mode is disabled, (A "NO" result in step 144), then step 144 is followed by step 142 which exits the routine without providing the user an opportunity to change the repeat mode. In this case, changing the repeat mode must occur prior to activation of the playback mode by navigating the usual setup menus described above if the user desires. Otherwise, the user is given the opportunity to dynamically change the repeat mode, via display of an on screen display, and receipt of user information to make the selection.

It is herein recognized that the present bookmark feature may be implemented using any one of a number of conventionally known methods, or combination of methods, for controlling the operation of the elements of disc player 24 described above, for example by using embedded software in a microcontroller. Also, the present override feature may be implemented for any signal processing system which can be configured to selectively restrict display contents in response to parental control ratings, or other program related information, included with stored audio, video and subpicture data, for example DVD-ROM systems, Laser Disc systems, etc. Therefore, it is to be understood that the present invention is intended to cover all modifications as would fall within the true scope and spirit of the present invention.

It will be apparent to those skilled in the art that although the present invention has been described in terms of an exemplary embodiment, modifications and changes may be made to the disclosed embodiment without departing from the essence of the invention.

What is claimed is:

1. A method for controlling a system for processing stored information on a storage medium, comprising the steps of:
   (A) playing back information on the storage medium using one of a plurality of repeat modes during a play mode of operation;
   (B) providing to a user, during the play mode of operation, an opportunity to select a repeat mode from among the plurality of repeat modes responsive to user input;
   (C) changing to playing back the information on the storage medium using the selected repeat mode during the play mode of operation.

2. The method of claim 1, wherein step (B) comprises the step of generating an on-screen display overlaid onto a video display by the system which allows the user to select one of a plurality of repeat modes while continuing to watch the program playback in a background portion of the video display.

3. The method of claim 2, wherein step (C) comprises the step of removing the on-screen display overlaid on the video display.

4. The method of claim 1, wherein step (B) is preceded by the step of determining whether a mode of operation enabling selection of one of the plurality of repeat modes during the play mode of operation is enabled; and
   performing steps (B) and (C) only if the mode of operation enabling modification of the plurality of repeat modes during play mode of operation is enabled.

5. The method of claim 4, wherein the step of determining whether user modification of a repeat mode is enabled is preceded by the step of determining whether the system is in play mode of operation.

6. The method of claim 5, wherein the system comprises a DVD player and the storage medium comprises a DVD disk.

7. The method of claim 1, wherein step (B) comprises the steps of: determining the plurality of repeat modes to be all possible repeat modes may be associated with the storage medium;
   determining which of the maximum number of the plurality of repeat modes are actually available for a particular storage medium;
   generating an on-screen menu displaying the available and unavailable repeat modes associated with a storage medium;
   selecting one of the available repeat.

8. The method of claim 7, wherein the storage medium is a DVD disk, and wherein:
   the step of determining the maximum number of repeat modes comprises setting a predetermined number in conformance with the DVD specification;
   the step of determining the repeat modes actually available for the particular DVD disk comprises evaluating data related to the DVD disk in non-volatile memory in the disk player.

9. The method of claim 7, wherein step (B) further comprises, after the generating step, a step for allowing a user to select from a repeat mode among a plurality of repeat modes actually available on the disk player for the storage medium.

10. Apparatus for processing information stored on a storage medium comprising:
   a storage medium data processor for accessing information stored on the storage medium during a play mode of operation of the apparatus; and
   a controller for:
      activating the play mode of operation using one of a plurality of repeat modes
      providing to a user during the play mode of operation an opportunity to select a repeat mode from among the plurality of repeat modes by an on-screen display overlaid onto the video display while continuing to watch the accessed information playback in a background portion of the video display responsive to changing the repeat mode setting of a video, and
      returning the apparatus to the play mode of operation using the selected repeat mode.

11. Apparatus for processing information, comprising:
   playback circuitry for retrieving information from the storage medium during a play mode of operation;
   a user control device, coupled to playback circuitry, for receiving user input;
   control circuitry, coupled to user control device and the playback circuitry, for conditioning the playback circuitry to retrieve information in the play mode of operation using one of a plurality of repeat modes, select one of the plurality of repeat modes during the play mode of operation in response to the user input, and change to retrieve information using the selected repeat mode during the play mode of operation.

12. The apparatus of claim 11, further comprising:
   an on-screen display control, coupled to the control circuitry; wherein:
   the control circuitry conditions on the on-screen display control to display a menu representing the plurality of repeat modes before selecting one of the plurality of repeat modes.

* * * * *